Figure 1:
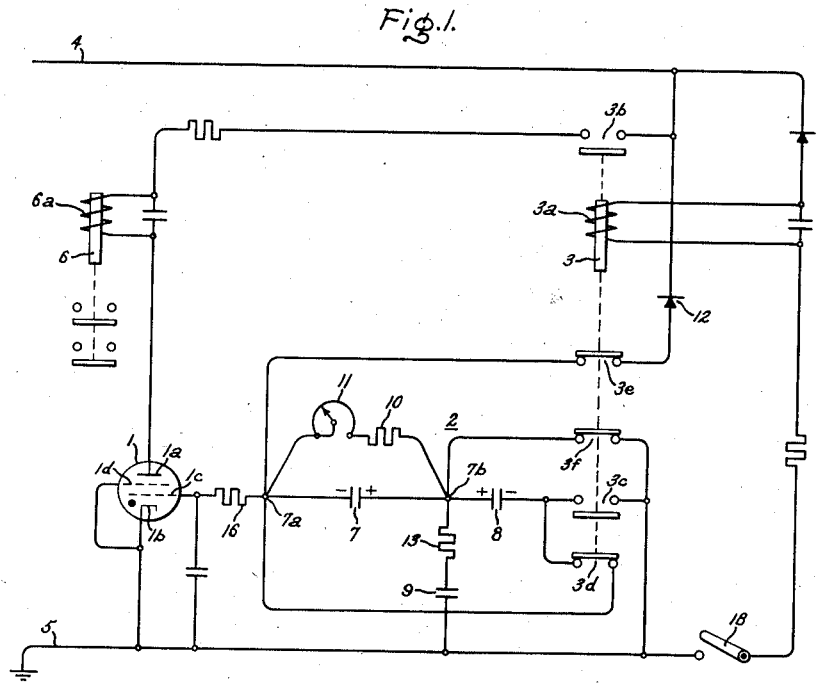
Figure 4A:
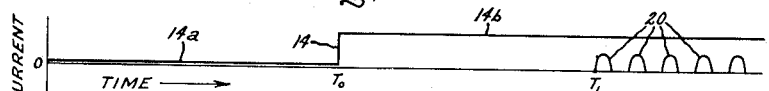
Figure 4B:
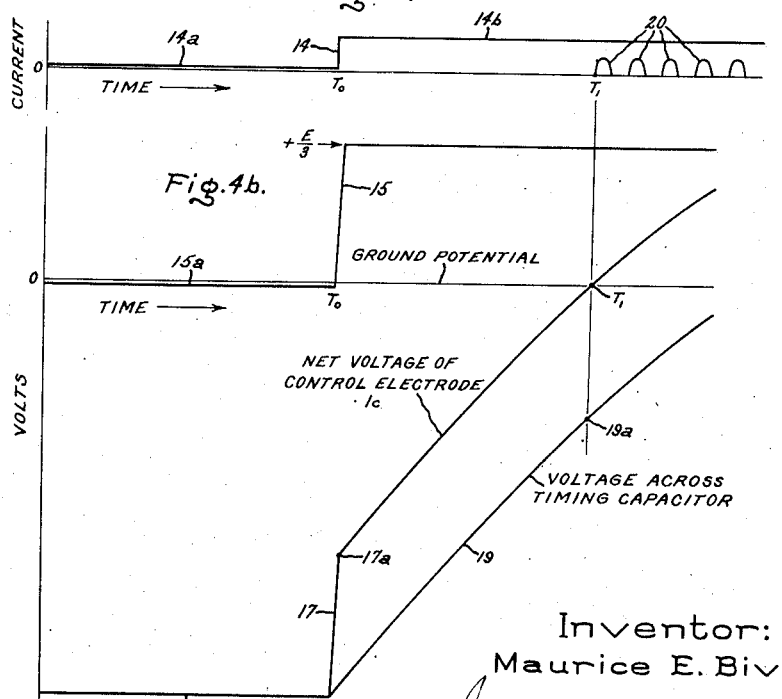

April 15, 1958

M. E. BIVENS 2,831,111

ELECTRIC TIMER

Filed June 28, 1955

3 Sheets-Sheet 1

Inventor:
Maurice E. Bivens,
by Irving H. Marshman.
His Attorney.

TIME ⟶

Inventor:
Maurice E. Bivens,
by Irving H. Marshman.
His Attorney.

April 15, 1958 M. E. BIVENS 2,831,111
ELECTRIC TIMER
Filed June 28, 1955 3 Sheets-Sheet 3
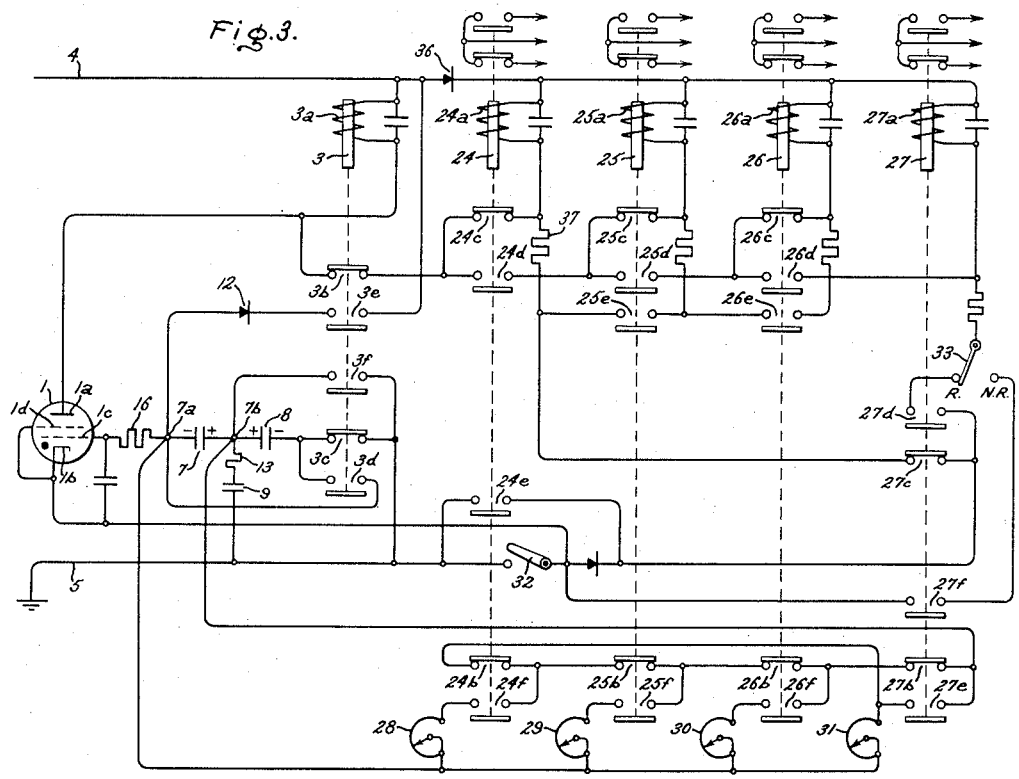
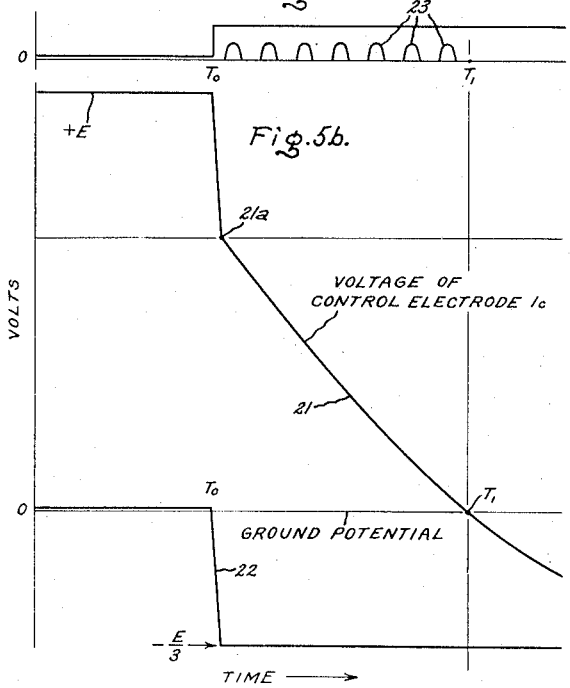
Inventor:
Maurice E. Bivens
by Irving H. Marshman
His Attorney.

United States Patent Office 2,831,111
Patented Apr. 15, 1958

2,831,111

ELECTRIC TIMER

Maurice E. Bivens, Schenectady, N. Y., assignor to General Electric Company, a corporation of New York Application June 28, 1955, Serial No. 518,643

12 Claims. (Cl. 250—27)

This invention relates to electric timers, more particularly to capacitor-type electric timers and it has for an object the provision of a simple, reliable and improved timer of this character.

In capacitor-type timers, the charge or discharge of a capacitor through a timing resistance is frequently employed for controlling the conductivity of an electric valve which in turn controls the device of which one or more of its operations is to be accurately timed. Such electric valve usually has an anode, a cathode and a control electrode, and the conductivity in its anode-cathode circuit is controlled by means of a voltage supplied between the cathode and control electrode. Electric valves of this character have critical control voltage characteristics which require the application of control voltages of certain values in order to effect the desired control of the conductivities of their anode-cathode circuits. In general, the critical control voltage characteristic of an electric valve is slightly negative, i. e. the critical value of the control voltage increases slightly in a negative sense in accordance with increasing values of the applied positive anode voltage. However, for convenience in explaining their operations such valves are generally assumed to have zero critical control electrode voltage characteristics and such assumption is made in the following specification.

For best results in timing, the electric valve which responds to capacitor charge or discharge should terminate the timing period at a time when the capacitor voltage is changing rapidly. The best results are obtained if the timing interval is terminated when the timing capacitor has discharged to about 37 percent of its initial voltage (or charged to about 63% of its final voltage). In order that the voltage supplied from the timing capacitor circuit to the control electrode of the valve shall equal the critical control electrode voltage or zero volts at the end of the desired interval of time, an opposing reference voltage equal to about 37% of the initial capacitor voltage is required in series with the timing capacitor voltage.

Regardless of the initial value of the voltage to which a capacitor is charged, it always discharges to 37% of such initial value in a period which is numerically equal to the RC of its circuit, or discharges to a given percentage of the initial value in a given time interval. Consequently, the voltage of the charge remaining on a capacitor at the end of a predetermined time after initiation of its discharge varies with the magnitude of the initial voltage. If the reference voltage is a constant, i. e. has the same value regardless of the initial value of the voltage to which the timing capacitor is charged, the time within which the difference between such constant reference voltage and the voltage of the timing capacitor attains a predetermined value varies with the value of the initial voltage. This leads to erratic timing if the initial voltage to which the timing capacitor is charged is obtained from a supply source of which the voltage fluctuates, especially if the supply voltage or reference voltage fluctuates during the timing interval.

In a number of industrial applications, a high degree of accuracy of timing is required for certain operations. For example, in resistance welding exacting accuracy of timing of the flow of the welding current is required. The magnitude of the welding current is usually very large, i. e. many thousand amperes. Consequently, the initiation and interruption of welding current often causes wide fluctuations in the supply line voltage. Since the timing circuits usually are supplied from the same supply line, operation of a welding machine frequently adversely affects the timing accuracy of an unregulated capacitor-type timer and that of similar timers of adjacent welding machines supplied from the same source.

Under service conditions therefore, good timing i. e. stability and repetitive accuracy of timing depend on maintaining a predetermined relationship between the reference voltage and the initial voltage to which the timing capacitor is charged regardless of either gradual or abrupt changes of the supply voltage occurring either prior to or during the timing period.

Accordingly, a further object of this invention is the provision of a capacitor-type electric timer which maintains its precision without auxiliary regulating means by maintaining a predetermined relationship between a reference or bias voltage and the initial value of the voltage to which the timing capacitor is charged regardless of gradual or abrupt changes in the supply source of the charging voltage.

Another object of the invention is to produce extreme accuracy of timing by means of a capacitor-type timer in which the sizes of the capacitors employed are reduced to a minimum.

In carrying the invention into effect in one form thereof, an electric valve having an anode, a cathode and a control electrode is provided together with a sampling capacitor and a timing circuit which comprises a timing capacitor and a bias capacitor serially connected between the cathode and control electrode of the valve. An adjustable discharge resistor, the timing resistance, is connected in parallel with the timing capacitor. An initiating switching device has contacts which when in first position short circuit the bias capacitor, connect the sampling capacitor in parallel with the timing capacitor, complete charging connections from a source of charging voltage to the timing and sampling capacitors and which when operated to a second position close the timing tube anode circuit, interrupt the charging connections, unshort the bias capacitor, disconnect the sampling capacitor from the timing capacitor and connect it in parallel with the bias capacitor.

Figure 2:
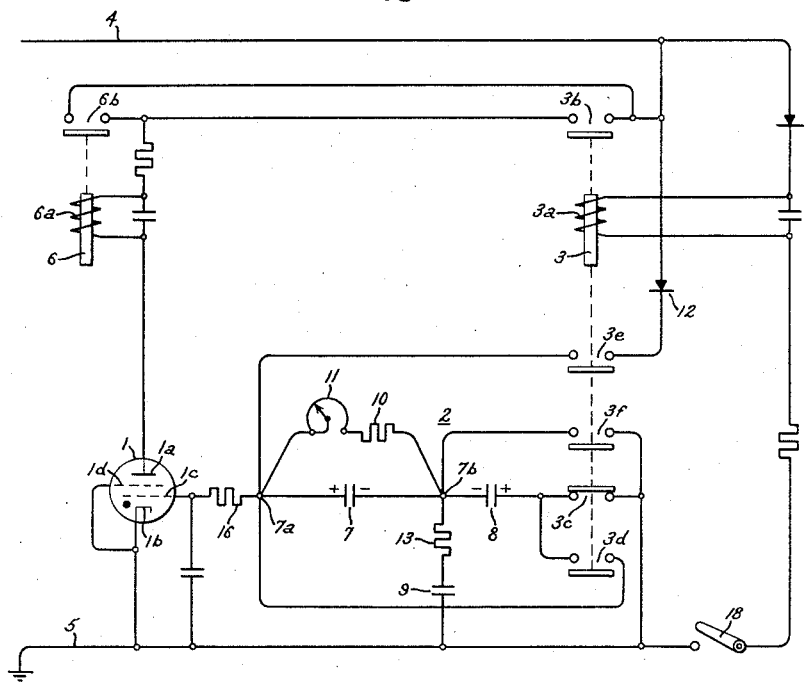

For a better understanding of the invention, reference should now be had to the following specification and to the accompanying drawings of which Fig. 1 is a simple diagrammatical sketch of an embodiment of the invention, Fig. 2 is a modification, Fig. 3 is an application of the timer of Fig. 1 in a sequencing control, and Figs. 4a, 4b, 5a, 5b and 6 are charts of characteristic curves which facilitate an understanding of the invention and a number of its modes of operation.

Referring now to the drawing, this electronic timer is illustrated as comprising an electric valve 1 and a resistance capacitance timing circuit 2 and an initiating switching device 3. The electric valve 1 may be of any suitable type. Preferably, it is a thyratron and has an anode $1a$, a cathode $1b$, a control electrode $1c$ and a shield electrode $1d$. Alternating voltage is supplied to its anode-cathode circuit from a suitable source which is represented by the two supply terminals 4 and 5 of which the terminal 5 is connected to ground. The cathode $1b$ is directly connected to terminal 5 and the anode 1a is connected through the operating coil 6a of an electromagnetic switching device 6 and a normally open contact 3b of the initiating switching device 3 to the supply terminal 4. Because its response to the timing circuit is utilized to effect an operation of a controlled device at the termination of a timed interval, the valve 1 is referred to as the timing valve.

As shown, the timing circuit 2 comprises a timing capacitor 7, a sampling capacitor 8 and a bias capacitor 9. The timing capacitor 7 and the bias capacitor 9 are connected in series relationship between the control electrode and the cathode of the valve. A discharge circuit comprising a fixed resistor 10 and an adjustable resistor 11 hereinafter referred to as the timing resistance, is connected in parallel with the timing capacitor 7. Although the initiating switching device 3 may be of any suitable type, it is illustrated as an electromagnetic relay having an operating coil 3a, normally open contacts 3b and 3c, and normally closed contacts 3d, 3e and 3f. In the deenergized condition of relay 3 its normally closed contacts 3f short circuit the bias capacitor 9. The sampling capacitor 8 is connected in parallel with the timing capacitor 7 through the normally closed contacts 3d of the initiating switching device.

Voltage for charging the timing capacitor 7 and the sampling capacitor 8 is supplied from the source 4, 5. One terminal of each of these capacitors is connected through normally closed contact 3e of the initiating device to the supply terminal 4 and the other terminal of each of these capacitors is connected through normally closed contact 3f to the other supply terminal 5. A rectifier 12 is included in the charging connections between contacts 3e and supply terminal 4. It is poled to charge the timing capacitor 7 negative at the terminal which is connected to the control electrode 1c of the valve and positive at the remote terminal.

In the energized condition of initiating relay 3, its normally closed contacts 3e are open to interrupt the charging connections for the timing capacitor 7 and the sampling capacitor 8, its normally closed contacts 3f are open to allow the biasing capacitor 9 to be charged by the sampling capacitor 8, its normally closed contacts 3d are open to disconnect the negative terminals of the timing capacitor 7 and the sampling capacitor 8, and the normally open contacts 3c are closed to connect the sampling capacitor 8 in parallel with the bias capacitor 9. A resistor 13 is included in circuit with the bias capacitor to limit the flow of current. Resistor 13 has a relatively low resistance, e. g. 100 to 10,000 ohms. Preferably the ratio of the capacitance of the sampling capacitor 8 and the bias capacitor 9 is such that the voltage to which the bias capacitor 9 is charged by the sampling capacitor when contacts 3c are closed is approximately equal to the voltage of the timing capacitor when it is discharged to 37% of its initial voltage. This result is substantially achieved by a relationship in which the capacitance of the bias capacitor 9 is twice the capacitance of the sampling capacitor 8.

With the foregoing understanding of the elements and their organization, the operation of the timer to effect a predetermined interval of time between an operation of the initiating relay and the establishment of an operating condition of the timing valve will readily be understood from the following detailed description. The operating coil of the initiating relay 3 is deenergized and the relay is dropped out. This condition is represented by the substantially zero ordinate 14a of the curve 14 of Fig. 4a. Ordinates of this curve may be assumed to represent the instantaneous values of the current in the operating coil 3a of the initiating relay. Since the bias capacitor 9 is short circuited by the normally closed contacts 3f of the initiating relay, its voltage is zero as represented by the substantially zero ordinate of the first horizontal portion 15a of curve 15 of Fig. 4b which represents the voltage of the terminal 7b of the three capacitors 7, 8 and 9. It is assumed that the rectifier 12 is poled to charge the timing capacitor 7 negative at its terminal 7a which is connected through resistor 16 to the control electrode 1c of the timing valve. Consequently, the timing capacitor and the sampling capacitor are charged to a voltage −E with reference to circuit point 5 or ground and the voltage at the control electrode is therefore represented by the ordinate −E of curve 17 of Fig. 4b in which ordinates represent voltage at the control electrode and abscissae represent time. Owing to the negative voltage on the control electrode, the valve is non-conductive.

At an instant of time which is designated $T_0$ the energizing circuit of the operating coil 3a is completed by closing the contact 18. These contacts may be the contacts of a manually operated switching device as shown or they may be those of an automatically operated device. In the interest of simplicity they are illustrated as contacts of a manually operated device.

In response to energization, the initiating relay picks up to open its normally closed contacts 3d, 3e and 3f and close its normally open contacts 3b and 3c. The energization and pick up of the initiating relay is represented by the vertical portion of the curve 14, and the picked up position is represented by the ordinant of the second horizontal portion 14b of the curve 14. Contacts 3e in opening interrupt the charging circuit for the timing and sampling capacitors 7 and 8 and contacts 3f in opening remove the short circuit from the bias capacitor 9. In opening, contacts 3d disconnect the sampling capacitor from the timing capacitor and contacts 3c in closing connect it in parallel with the bias capacitor 9. Thus, when the timing capacitor charging source is disconnected at the instant $T_0$ which marks the beginning of the time interval, the voltage of the sampling capacitor is exactly equal to the voltage of the timing capacitor since the two are connected in parallel until the contact 3d opens to disconnect the sampling capacitor 8 from the timing capacitor 7. At this instant the total charge on the sampling capacitor is $C_8E$.

As a result of the parallel connection, the sampling capacitor charges the bias capacitor 9 until the voltage of both are equalized at a new value $e$. Since the total charge on both capacitors is equal to the initial charge on the sampling capacitor, and assuming that the capacitance $C_9$ of capacitor 9 is two times the capacitance $C_8$ of capacitor 8, the relationship of the charges is represented by the following equations:

(1) $$C_8C = C_8e \quad C_9e = 3C_8e$$

and (2) $$e = \frac{E}{3}$$

in which E is the initial voltage on the sampling capacitor and $e$ is the new voltage on the sampling capacitor and the bias capacitor. In other words, the voltage on the bias capacitor is ⅓ the initial voltage of the timing capacitor whatever may have been the value of the voltage E of the timing capacitor at the beginning of the timed interval, i. e. at the instant of interrupting the charging connection. Thus, the ratio between the initial voltage of the timing capacitor and the voltage of the bias capacitor during the timed interval is fixed, and is not changed by any gradual or abrupt change in the supply voltage prior to or at the instant of initiation of the timed interval.

Since the negative terminal of the bias is connected to the cathode 1b and the positive terminal is connected toward the control electrode, the total voltage supplied to the control electrode consists of a component supplied by the bias capacitor which is represented by the ordinate $$+\frac{E}{3}$$

of curve 15 plus the component −E supplied by the timing capacitor which sum is represented by the ordinate 17a of curve 17. Thus at the beginning of the timed interval, the net voltage supplied from the timing circuit to the control electrode is $$-E + \frac{E}{3} \text{ or } \frac{-2E}{3}$$

as represented by the ordinate 17a of curve 17.

Following the interruption of the charging connections, the timing capacitor discharges through the discharge resistor 10 and the timing resistance 11 in accordance with a logarithmic function as represented by the curve 19 of which ordinates represent the value of the voltage at the capacitor terminals during the timed interval. Simultaneously, the net voltage supplied to the control electrode decreases in accordance with the logarithmic curve 17′ of which the ordinates represent the difference between the voltage of the timing capacitor and the voltage of the bias capacitor. The rheostat 11 is adjusted to provide a rate of discharge which will result in discharging the timing capacitor 7 to approximately 37% of its initial voltage at the end of an interval of time which is exactly equal to the desired interval. The instant of time $T_1$ at which this occurs is represented by the point 19a of curve 19. At this instant the value of the net voltage supplied to the control electrode 1c becomes zero which results in terminating the timed interval by initiating conduction in the anode-cathode circuit of the valve as represented by the positive half cycles 20 of Fig. 4a.

The length of the timed interval $T_0$ to $T_1$ is independent of abrupt or gradual changes in the supply voltage because, as pointed out in the foregoing, the voltage of the opposing bias capacitor is a fixed percentage of the voltage of the timing capacitor at the instant $T_0$, and the timing circuit will always discharge the timing capacitor to such fixed percentage of its initial value in exactly the same time irrespective of the magnitude of the initial voltage.

Reversal of the polarity of the rectifier 12 produces a different mode of operation which is illustrated graphically by the characteristic curves of Figs. 5a and 5b. Owing to this reversal, prior to the closing of contacts 18, the timing capacitor 7 and the sampling capacitor 8 are charged positive at terminal 7a which is connected to control electrode 1c. The magnitude of the voltage at terminal 7a is represented in Fig. 5b by the positive ordinate plus E of the curve 21. The bias capacitor is short-circuited during this time and therefore the voltage at terminal 7b is again represented by the substantially zero ordinate of the horizontal portion of curve 22. Consequently, the voltage supplied to the control electrode prior to the closing of contacts 18 is +E volts and the valve 1 is conductive but its anode circuit is open at relay contacts 3b.

A timing operation is initiated by closing the contact 18 to complete an energizing circuit for the operating coil of the initiating relay 3. In response to energization, it closes its normally open contacts and opens its normally closed contacts at time $T_0$ to initiate the timed interval. The closing of relay contact 3b allows valve 1 to conduct as represented by the rectified positive half cycles 23 shown in Fig. 5a. The opening of contact 3 disconnects the charging voltage from the timing capacitor 7 and sampling capacitor 8. The opening of contact 3f removes the short from the bias capacitor 9. The opening of contacts 3d and the closing of contacts 3c charge the bias capacitor to a voltage $$\frac{E}{3}$$

which is negative at the terminal 7b and thus a bias voltage of $$\frac{-E}{3}$$

as shown on curve 22 is supplied to the control electrode. Therefore the net voltage of the control electrode at the instant $T_0$ is $$\frac{2E}{3}$$

and is represented by the ordinate 21a of curve 21 in Fig. 5a. At the instant when the timing capacitor has discharged to about 37% of its initial charge, its voltage becomes less than the negative bias voltage. Consequently, the net voltage at the control electrode 1c becomes more negative than the critical firing value and the valve 1 ceases to conduct at time $T_1$ to terminate the timed interval. Since the control electrode is positive during the timed interval, control electrode current tends to flow. Consequently, in order that the timing shall be approximately proportional to the ohmic resistance of the discharge resistor, the resistance of the control electrode resistor 14 is made large in comparison with the resistance of discharge resistors 10 and 11.

A third mode of operation is provided by the modification illustrated in Fig. 2. This modification is similar to the modification of Fig. 1 but differs from it in the following respects: The polarity of the rectifier 12 is reversed; the anode circuit relay 6 is provided with normally open contacts 6b in parallel with normally open contacts 3b of the initiating relay and the initiating relay is constructed to have its contacts 3c normally closed and its contacts 3d, 3e and 3f normally open. For the reasons explained in connection with the Fig. 1 modification, the bias capacitor 9 is assumed to have a capacitance approximately twice the capacitance of the sampling capacitor 8. Prior to the beginning of the timing operation, the initiating switch 18 is closed and the timing operation is begun by opening it to deenergize and drop out the initiating relay 3. For this reason, the resulting mode of operation is referred to as time delay after deenergization or the TDAD mode.

Figure 6:
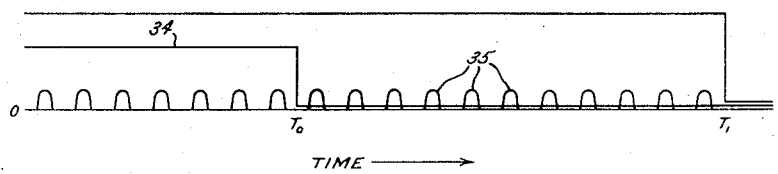

In the normally closed position of the initiating switch 18 an energizing circuit is completed for the operating coil 3a of the initiating relay 3. The magnitude of the energizing current is represented in Fig. 6 by the ordinate of the first horizontal section of curve 34. Relay 3 closes in response to energization to close its normally open contacts 3b, 3d, 3e and 3f and opens its normally closed contacts 3c. Contacts 3b complete the anode-cathode circuit of the timing electric valve 1. The opening of contacts 3c and the closing of contacts 3d connects the sampling capacitor 8 in parallel with the timing capacitor 7. Contacts 3f in closing short circuit the bias capacitor 9 and contacts 3e in closing complete the charging circuit for the timing capacitor 8. As shown, the rectifier 12 is poled to charge the timing capacitor 7 positive at the terminal 7a to which the control electrode 1c of the timing valve is connected. Consequently, the valve conducts and since the operating coil 6a of the timing relay 6 is connected in the anode circuit, the relay picks up and closes and its normally open contacts 6b in parallel with the contacts 3b of the initiating relay. Since the valve 1 conducts only during positive half cycles of anode voltage, its conduction is represented in Fig. 6 by a succession of half cycles 35.

The timing operation is initiated at time $T_0$ by opening the initiating switch 18 to deenergize the relay 3 which thereupon drops out and opens its normally open contacts 3b, 3d, 3e and 3f and closes its normally closed contacts 3c. The dropout of the initiating relay is represented by the vertical portion of curve 34. Although contacts 3d are opened, the timing relay 6 remains picked up by the sealing-in circuit through its own contacts 6b which are closed in the picked up position of the relay. The picked up condition of timing relay 6 is represented graphically by the curve 35'. The opening of contacts 3e interrupts the charging circuit for the timing capacitor 7 and the opening of contacts 3f removes the short circuit from the bias capacitor 9. Simultaneously, the contacts 3d in opening interrupt the parallel connection of the sampling capacitor to the timing capacitor and the contacts 3c in closing complete the connection of the sampling capacitor in parallel with the bias capacitor.

From the time $T_0$ the discharge of the timing capacitor proceeds in accordance with curve 21 of Fig. 5b until at time $T_1$ the voltage of the control electrode 1c becomes more negative than the critical value and valve 1 ceases to conduct. In response to deenergization, the timing relay 6 drops out and opens its normally open contacts which is represented graphically by the vertical portion of curve 35'. The reclosing of switch 18 leaves the device in a reset condition for a subsequent timing operation.

In Fig. 3 modification, the timer is utilized to produce timed sequential operation of a plurality of relays 24, 25, 26 and 27. A plurality of discharge timing resistors 28, 29, 30 and 31 for the timing capacitor 7 provide individual timing adjustment of the relays 24, 25, 26 and 27 respectively.

Prior to the closing of contacts of a starting switch 32, the timing capacitor 7 is discharged by the discharge resistor 31 which is connected in parallel with the timing capacitor 7 through the normally closed contacts 24b, 25b, 26b and 27b of the sequence relays. The rectifier 12 is poled to charge the timing capacitor positive at the terminal 7b and negative at the terminal 7a. Consequently, the voltage at the terminal 7b is positive if the positive charge remains on the bias capacitor 9 from the previous operation or it is zero if the timer has been standing idle for a period of sufficient duration to allow the charge to leak off. In either case, the valve 1 is in readiness to fire upon a completion of the circuit of the cathode 1b to the supply terminal 5.

The timed sequence is initiated by closing the contacts of starting switch 32 which causes the timing valve 1 to fire in the first positive half cycle of its anode voltage and thus to energize the operating coil of the sequence advancing relay 3 and the operating coil 24a of the first sequence relay 24. In response to energization, relay 3 opens its normally closed contacts 3b and 3c, and closes its normally open contacts 3d, 3e, and 3f. Contact 3c opening and contact 3d in closing connect the sampling capacitor 8 in parallel with the timing capacitor 7 whereas the closing of contacts 3f short circuits the bias capacitor 9. Relay 24 in response to energization of its operating coil opens its normally closed contacts 24b and 24c and closes its normally open contacts 24d, 24e and 24f. The operating coil of relay 24 is thereby disconnected from the valve 1 anode circuit but the coil remains energized through rectifier 36, holding resistor 37, contact 27c and contact 24e. Contacts 24e also complete a sealing-in circuit around the contacts of starting switch 32 which now may be released. Contacts 24b in opening and contacts 24f in closing switch from timing adjustment resistor 31 and switch the timing adjustment resistor 28 in parallel with the timing capacitor 7. Contacts 3b open before contacts 24d close and consequently the operating coil of the second sequence relay 25 remains deenergized during this half cycle of conduction of timing valve 1.

In their closed positions, contacts 3e and 3f complete charging connections for the timing capacitor 7 and the sampling capacitor 8 and in the immediately succeeding negative half cycle of supply voltage, these capacitors are charged positive at the terminal 7b and negative at the terminal 7a. Consequently, the timing valve is rendered non-conducting at the end of its first half cycle of conduction and the sequence advancing relay 3 is deenergized and dropped out to open its normally open contacts and close its normally closed contacts. The opening of contacts 3e interrupts the charging connections and initiates the timing discharge of the timing capacitor through adjustable timing discharge resistor 28. The opening of contacts 3f interrupts the short circuit about the bias capacitor 9 and the opening of contacts 3d and the closing of contacts 3c disconnect the sampling capacitor from the timing capacitor 7 and connect it in parallel with the bias capacitor 9 to charge capacitor 9 positive at the terminal 7b.

At the end of a time interval which is determined by the adjustment of the adjustable timing resistor 28, the timing capacitor 7 is discharged to about 37% of its initial charge, the control electrode voltage attains the critical firing value and the timing valve 1 fires a second time to complete energizing circuits for the operating coil 3a of the sequence advancing relay 3 and the operating coil 25a of the second sequencing relay 25.

In response to energization, relay 25 picks up, opens its normally closed contacts 25b and 25c and closes its normally open contacts 25d, 25e and 25f. The closing of contacts 25e complete a sealing-in circuit for relay 25. Contacts 25b in opening and contacts 25f in closing switch the timing adjustment resistor 28 out of circuit with the timing capacitor and switch the timing adjustment resistor 29 in parallel with the timing capacitor.

The timing valve is again rendered non-conducting at the end of the first half cycle of conduction in the manner previously described and the sequence advancing relay 3 is deenergized and dropped out. However, relay 25 remains picked up through its sealing-in contacts.

At the termination of a predetermined time interval the length of which is determined by the adjustment of the timing resistor 29, the valve 1 is again rendered conducting and this time the third sequencing relay 26 picks up and seals itself in and the timing resistor 29 is switched out of circuit with the timing capacitor 7 and the adjustable timing resistor 30 is switched in parallel therewith. Again, the timing valve 1 is rendered non-conducting at the end of its first half cycle of conduction. At the end of a third predetermined interval of time of which the length is determined by the adjustment of the timing resistor 30, the valve 1 is again rendered conducting to pick up the sequence relay 3 and the fourth sequencing relay 27. Responsively to energization, relay 27 picks up and opens its normally closed contacts and closes its normally open contacts. Normally closed contacts 27b in opening and normally closed contacts 27c in closing switch the timing resistor 30 out of circuit with the timing capacitor 7 and switch the adjustable timing resistor 31 in parallel therewith. Contacts 27d in closing complete a sealing-in circuit and contacts 27c in opening interrupt the sealing-in circuits of the sequence relays 24, 25 and 26 which thereupon drop out in response to deenergization.

Contacts 24e of relay 24 in opening interrupt the sealing-in circuit for the relay 27 which thereupon drops out to open its normally open contacts and close its normally closed contacts. The opening of normally open contacts 27e does not terminate the timing action of the timing circuit because the substantially simultaneous closing of contacts 27b maintains the timing adjustment resistor 31 connected in parallel with the timing capacitor 7 through the normally closed contacts 24b, 25b and 26b which are now closed in response to the deenergization of relays 24, 25 and 26.

At the end of a predetermined interval of time which is determined by the adjustment of resistor 31, the timer is in a reset condition in which the timing valve 1 is in readiness to fire to repeat the timing sequence described in the foregoing if the repeat-non-repeat switch 33 is in the repeat position in which it is illustrated in the drawing. If the switch 33 is in the non-repeat position, the starting switch 32 must again be closed to initiate the operating cycle.

Although in accordance with the provisions of the patent statutes, this invention has been described as embodied in concrete form and the principle thereof has been explained together with the best mode in which it is now contemplated in applying that principle, it will be understood that the apparatus shown and described is merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States is:

1. A timer comprising an electric valve having an anode, a cathode and a control electrode, a timing circuit comprising a charged timing capacitor connected between said cathode and control electrode, a discharge resistor connected in parallel with said capacitor, a voltage sampling capacitor connected in parallel with said timing capacitor, a normally short circuited bias capacitor connected in series with said timing capacitor, and an initiating switching device for substantially simultaneously disconnecting said sampling capacitor from said timing capacitor, removing the short circuit from said bias capacitor and connecting said sampling capacitor in a circuit in parallel with said bias capacitor circuit.

2. A timer comprising an electric valve having an anode, a cathode and a control electrode, a bias capacitor and a timing capacitor serially connected between said cathode and control electrode, a sampling capacitor, a pair of charging voltage supply terminals, and an initiating switching device having contacts operable to a first position to complete charging connections from said terminals to said timing capacitor, connect said sampling capacitor in parallel with said timing capacitor and short circuit said bias capacitor and operable to a second position to interrupt said short circuit, disconnect said sampling capacitor from said timing capacitor and connect said sampling capacitor in a circuit in parallel with said bias capacitor circuit.

3. A timer comprising an electric valve having an anode, a cathode and a control electrode, a timing circuit comprising a normally charged timing capacitor connected between said cathode and said control electrode, a discharge resistor connected in parallel with said timing capacitor, a voltage sampling capacitor normally connected in parallel with said timing capacitor to provide at its terminals a voltage equal to the voltage of said timing capacitor, a normally short circuited bias capacitor serially connected in circuit with said timing capacitor and having a capacity approximately double the capacity of said sampling capacitor, and an initiating switching device for interrupting the short circuit about said bias capacitor, disconnecting said sampling capacitor from said timing capacitor and connecting said sampling capacitor in a circuit in parallel with the circuit including said bias capacitor.

4. A timer comprising an electric valve having an anode, a cathode and a control electrode, a timing circuit comprising a timing capacitor connected between said cathode and control electrode, a discharge resistor connected in parallel with said capacitor, a voltage sampling capacitor connected in parallel with said timing capacitor, a pair of alternating voltage supply terminals, a charging circuit for said capacitors supplied from said terminals, a rectifier included in said charging circuit poled to charge said timing capacitor negative at the terminal connected to said control electrode, a normally short circuited bias capacitor connected in circuit with said timing capacitor, and an initiating switching device for interrupting the short circuit about said bias capacitor, disconnecting said sampling capacitor from said timing capacitor and connecting it in a circuit in parallel with the circuit of said bias capacitor.

5. A timer comprising an electric valve having an anode, a cathode and a control electrode, a bias capacitor and a timing capacitor serially connected between said cathode and control electrode, a discharge resistor connected in parallel with said timing capacitor, a sampling capacitor, a pair of alternating voltage supply terminals, an initiating switching device having contacts operable to a first position to complete charging connections from said terminals to said timing capacitor, connect said sampling capacitor in parallel with said timing capacitor and short circuit said bias capacitor and operable to a second position to interrupt said charging connections and said short circuit, disconnect said sampling capacitor from said timing capacitor and connect said sampling capacitor in a circuit with said bias capacitor and a rectifier included in said charging connections poled to charge said timing capacitor positive at the terminal connected to said control electrode.

6. A timer comprising an electric valve having an anode, a cathode, and a control electrode, a bias capacitor having one terminal connected to said cathode, a timing capacitor connected in series with said bias capacitor and having one terminal connected to said control electrode; a discharge resistor connected in a circuit with said timing capacitor, a sampling capacitor, a pair of alternating voltage supply terminals, an initiating switch having contacts operable to a first position to complete charging connections from said terminals to said timing capacitor, connect said sampling capacitor in parallel with said timing capacitor and short circuit said bias capacitor and operable to a second position to interrupt said charging connections and said short circuit, disconnect the negative terminal of said sampling capacitor from the negative terminal of said timing capacitor and connect it to the terminal of said bias capacitor connected to said control electrode, and a rectifier included in said charging connections and poled to charge said timing capacitor negative at the terminal connected to said control electrode thereby to render said valve conducting an interval of time after operation of said switching device to said second position required for said timing capacitor to discharge substantially to the value of the voltage on said bias capacitor.

7. A timer comprising an electric valve having an anode, a cathode and a control electrode, a bias capacitor and a timing capacitor connected in series relationship between said cathode and said control electrode with one terminal of said timing capacitor connected to said control electrode and one terminal of said bias capacitor connected to said cathode, a discharge resistor connected in a circuit with said timing capacitor, a sampling capacitor, a pair of alternating voltage supply terminals, an initiating switching device having contacts operable to a first position to complete charging connections from said terminals to said timing capacitor, short circuit said bias capacitor and connect said sampling capacitor in parallel with said timing capacitor and operable to a second position to interrupt said charging connections and said short circuit, disconnect the positive terminal of said sampling capacitor from the positive terminal of said timing capacitor and connect it to the terminal of said bias capacitor connected to said cathode, and a rectifier included in said charging connections poled to charge said timing capacitor positive at the terminal connected to said control electrode thereby to render said valve conducting in response to operation of said switching device to said second position and to render said valve non-conducting at the end of the time interval required for said timing capacitor to discharge substantially to the value of said bias capacitor.

8. A timer comprising an electric valve having an anode, a cathode and a control electrode, a timing circuit comprising a timing capacitor connected between said cathode and said control electrode, a discharge resistor connected in parallel with said timing capacitor, a voltage sampling capacitor, a pair of charging voltage supply terminals, a bias capacitor serially connected in circuit with said timing capacitor and having a capacity approximately twice the capacity of said sampling capacitor to provide for supplying to said control electrode a voltage equal to the critical firing voltage of said valve in response to discharge of said timing capacitor to a value within a range of 30 to 45% of an initial voltage, and an initiating switching device having contacts operable to a first position to short circuit said bias capacitor, connect said sampling capacitor in parallel with said timing capacitor and complete charging connections from said terminals to charge said timing and sampling capacitors to said initial value, and operable to a second position to interrupt said short circuit, disconnect said sampling capacitor from said timing capacitor and connect it in a local circuit with said bias capacitor.

9. An electric timer comprising a pair of supply terminals, an electric valve having an anode, a cathode and a control electrode, means for supplying voltage to said anode and cathode, a timing circuit comprising a timing capacitor connected between said cathode and control electrode, a timing discharge resistor therefore, a bias capacitor connected in circuit with said timing capacitor and a voltage sampling capacitor, and a switching device having a plurality of contacts operable to a first position to complete charging connections from said timing capacitor to said terminals, connect said sampling capacitor in parallel with said timing capacitor and short circuit said bias capacitor, and operable to a second position to interrupt said charging connections and said short circuit and connect said sampling capacitor in parallel with said bias capacitor.

10. An electric timer comprising a pair of alternating voltage supply terminals, an electric valve having an anode, a cathode and a control electrode, means for supplying voltage to said anode and cathode, a timing circuit comprising a timing capacitor connected between said cathode and said control electrode, a timing discharge resistor therefor, a bias capacitor connected in circuit with said timing capacitor, and a voltage sampling capacitor, partially completed charging connections from said alternating voltage supply terminals to said timing capacitor including a rectifier poled to charge said timing capacitor negative at the terminal connected to said control electrode and a switching device having a plurality of contacts operable to a first position to complete said charging connections, connect said sampling capacitor in parallel with said timing capacitor and short circuit said bias capacitor, and operable to a second position to interrupt said charging connections, said short circuit and said parallel connection of said sampling capacitor and said timing capacitor and connect said sampling capacitor in parallel with said bias capacitor.

11. An electric timer comprising a pair of alternating voltage supply terminals, an electric valve having an anode, a cathode and a control electrode, means for supplying voltage to said anode and cathode, a timing circuit comprising a timing capacitor connected between said cathode and said control electrode, a timing discharge resistor therefor, a bias capacitor connected in circuit with said timing capacitor, and a voltage sampling capacitor, partially completed charging connections from said alternating voltage terminals to said timing capacitor including a rectifier poled to charge said timing capacitor negative at the terminal connected to said control electrode, an electromagnetic switching device having a plurality of contacts operable to a first position in the deenergized condition of said device to complete said charging connections, connect said sampling capacitor in parallel with said timing capacitor and short circuit said bias capacitor, and means for energizing said switching device to operate said contacts to a second position to interrrupt said charging connections, said short circuit and the parallel connection between said sampling capacitor and timing capacitor, and connect said sampling capacitor in parallel with said bias capacitor.

12. An electric timer comprising a pair of alternating voltage supply terminals, an electric valve having an anode, a cathode, and a control electrode, partially completed connections from said anode and cathode to said supply terminals, a timing circuit comprising a timing capacitor connected between said cathode and control electrode, a timing discharge resistor therefor, a bias capacitor connected in circuit with said timing capacitor, and a voltage sampling capacitor, partially completed charging connections for said timing capacitor including a rectifier poled to charge said timing capacitor positive at the terminal connected to said control electrode, an electromagnetic switching device having a first pair of contacts operable to a first position in response to energization of said device to complete said anode connections and a plurality of contacts operable to a first position to complete said charging connections, connect said sampling capacitors in parallel with said timing capacitor and short circuit said bias capacitor, an electromagnetic switching device connected to be responsive to conduction in the anode-cathode circuit of said valve for completing a connection in parallel with said first pair of contacts, and means for deenergizing said first electromagnetic switching device to operate said first pair of contacts to the open position and to operate said plurality of contacts to a second position to interrupt said charging connections, said short circuit and the parallel connections between said sampling capacitor and said timing capacitor and connect said sampling capacitor in parallel with said bias capacitor.

References Cited in the file of this patent

UNITED STATES PATENTS

| | | |
|---|---|---|
| 1,907,279 | Blomberg | May 2, 1933 |
| 2,593,964 | Birckhead | Apr. 22, 1952 |
| 2,607,907 | Marshall | Aug. 19, 1952 |
| 2,608,653 | Cochran | Aug. 26, 1952 |

OTHER REFERENCES

Pub. 1, "Staircase Generator Counts Pulses," Electronics, March 1954, pp. 187–189.